US009649939B2

(12) United States Patent
Bissontz

(10) Patent No.: US 9,649,939 B2
(45) Date of Patent: May 16, 2017

(54) ISOLATION CONTACTOR STATE CONTROL SYSTEM

(75) Inventor: Jay E. Bissontz, Fort Wayne, IN (US)

(73) Assignee: International Truck Intellectual Property Company, LLC, Lisle, IL (US)

(*) Notice: Subject to any disclaimer, the term of this patent is extended or adjusted under 35 U.S.C. 154(b) by 339 days.

(21) Appl. No.: 14/398,083

(22) PCT Filed: Jul. 13, 2012

(86) PCT No.: PCT/US2012/046598
§ 371 (c)(1), (2), (4) Date: Oct. 30, 2014

(87) PCT Pub. No.: WO2014/011184
PCT Pub. Date: Jan. 16, 2014

(65) Prior Publication Data

US 2015/0130274 A1 May 14, 2015

(51) Int. Cl.

*H02J 1/00* (2006.01)
*B60L 1/00* (2006.01)
*B60L 3/00* (2006.01)
*B60L 3/04* (2006.01)

(52) U.S. Cl.

CPC ........... *B60L 3/0069* (2013.01); *B60L 3/0084* (2013.01); *B60L 3/0092* (2013.01); *B60L 3/04* (2013.01); *Y10T 307/675* (2015.04)

(58) Field of Classification Search

USPC ............................................ 307/85–87, 10.1
See application file for complete search history.

(56) References Cited

U.S. PATENT DOCUMENTS

| | | | |
|---|---|---|---|
| 6,153,990 | A | 11/2000 | Feil |
| 6,768,221 | B2 | 7/2004 | Klinger |
| 2002/0096379 | A1 | 7/2002 | Sims |
| 2010/0013302 | A1 | 1/2010 | Howell |

OTHER PUBLICATIONS

International Search Report of corresponding PCT application.

*Primary Examiner* — Rexford Barnie
*Assistant Examiner* — Dru Parries
(74) *Attorney, Agent, or Firm* — Jeffrey P. Calfa; Mark C. Bach

(57) ABSTRACT

A controller area network (CAN) installed on a hybrid electric vehicle provides one node with control of high voltage power distribution system isolation contactors and the capacity to energize a secondary electro-mechanical relay device. The output of the secondary relay provides a redundant and persistent backup signal to the output of the node. The secondary relay is relatively immune to CAN message traffic interruptions and, as a result, the high voltage isolation contactor(s) are less likely to transition open in the event that the intelligent output driver should fail.

11 Claims, 2 Drawing Sheets

10
46
44
32
20
22
34
HV BATTERY
BMS
42
30
24
26
36
14
28
12
18
KEY SWITCH
1 2 3 4
16
40
39
48
50
52

ISOLATION CONTACTOR STATE CONTROL SYSTEM

U.S. GOVERNMENT RIGHTS

This disclosure was made with United States government support under Award No. DE-EE0003303 awarded by the U.S. Department of Energy. The United States government has certain rights in this disclosure.

BACKGROUND

Technical Field

The technical field relates generally to isolation contactor control in an electrical power distribution system for a vehicle and, more particularly, to preventing unscheduled, transitory interruptions in isolation contactor states.

Description of the Technical Field

Electric and hybrid electric vehicles are usually equipped with one or more high voltage, direct current, electrical power distribution subsystems by which power is supplied to vehicle traction motors and other high voltage loads. High voltage isolation contactors have been used to control the energization and de-energization of the high voltage DC power distribution sub-systems and to control the flow of power to loads such as traction motors and vehicle accessory motors. It has been long recognized that the action of opening a high voltage isolation contactor can substantially reduce the service life of the contactor due to arcing. The problem with arcing becomes more pronounced as facing surfaces of a contactor incur surface damage accelerating the process and potentially resulting in premature failure.

The occurrence of unintended transitions of high voltage isolation contactors at times outside the design considerations of the system can be particularly damaging. Such events can also result in system behavior outside of operational modes consistent with reliable operation of electric and hybrid electric vehicles. Among the causes of unintended high voltage isolation contactor transitions which occur when a vehicle electrical power distribution system is energized are: interference in data communication between network nodes of a vehicle control network; compromised energy interfaces; localized drift in the potential level of vehicle ground plains caused by isolated active high voltage electrical potential leaking into the vehicle mass; and compromised or damaged wiring.

SUMMARY

A backup system for holding the high voltage isolation contactors closed during and after energization is provided. A controller area network (CAN) based electrical control architecture within a hybrid electric or electric vehicle controls at least one intelligent output driver for the control of at least one high voltage power distribution system isolation contactor, while at the same time using the same or a similar output to energize a secondary electro-mechanical relay device. The output of the secondary relay is fed back to its own control input to provide a redundant and persistent backup to the output of the intelligent output driver. The secondary relay is relatively immune to interruptions and, as a result, the high voltage isolation contactor(s) will not transition open in the event that the intelligent output driver should fail to deliver the adequate electrical potential for persistent high voltage isolation contactor closure.

DETAILED DESCRIPTION

Figure 1:
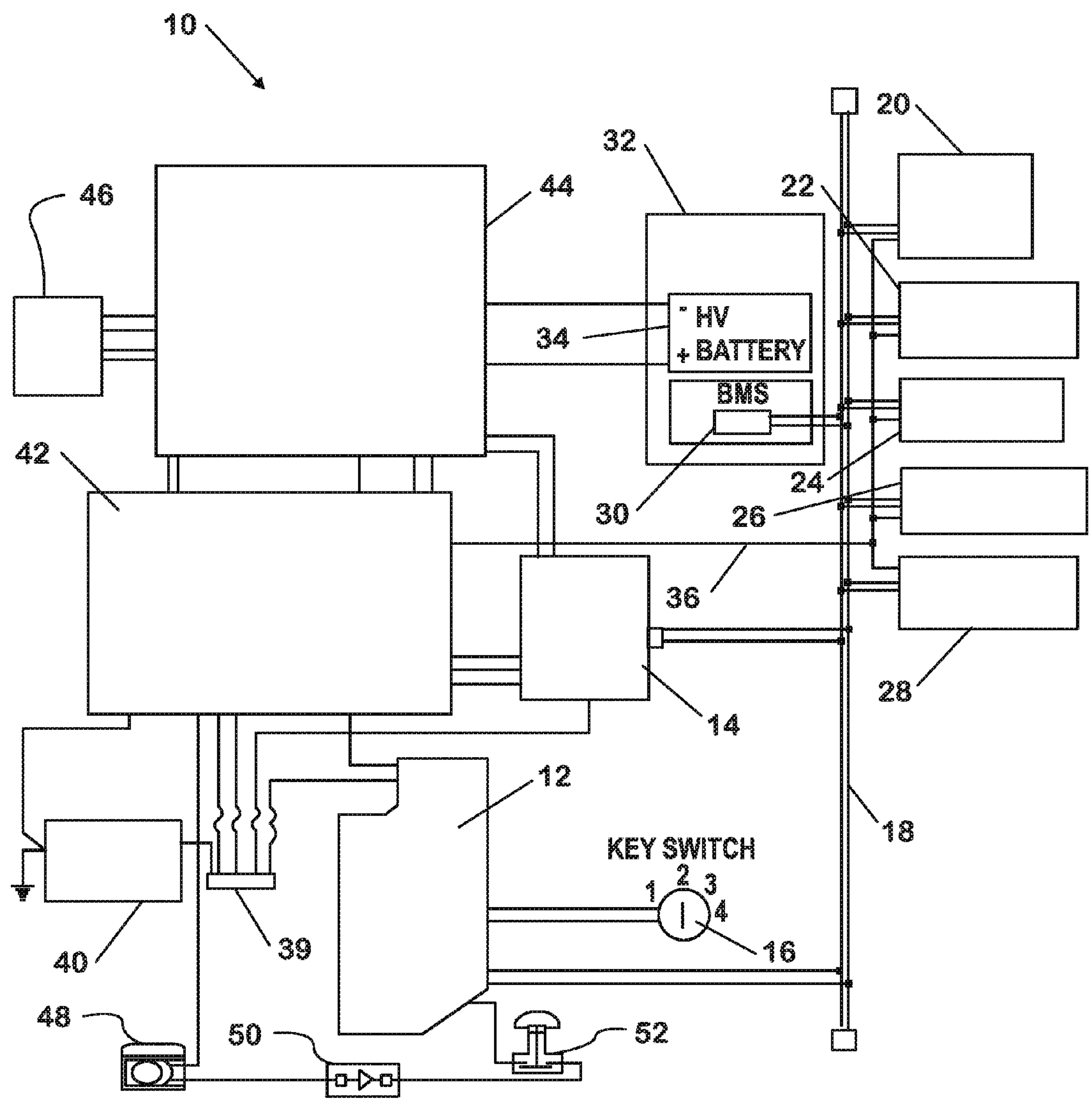
FIG. 1 is a high level schematic view of a vehicle electrical power distribution control system.

In the following detailed description, like reference numerals and characters may be used to designate identical, corresponding, or similar components in differing drawing figures.

Referring now to the figures, and in particular to FIG. 1, there is shown a simplified schematic diagram of a vehicle electrical power distribution control system 10. An intelligent controller area network (CAN) module such as a body computer 12, in conjunction with an associated remote power module (RPM) 14, is connected to operate in response to signals from other devices, such as an ignition switch 16 or functionally equivalent input device, to change system states of the electrical power distribution control system 10 and particularly to change the energization states of a low voltage bus 36 and a high voltage bus 37. RPM 14 provides many of the control signals which implement the energization state. RPM 14 operates under direct control of body computer 12. and both the RPM and the body computer are nodes of the CAN.

Electrical power distribution control system 10 includes at least two power distribution systems including a system based on a low (typically 12 volts DC) voltage bus 36 and a system based on a high voltage (typically at least 350 volts DC) bus 37. Body computer 12 and RPM 14, which communicate with one another over serial datalink 18, control energization and deenergization of both distribution systems. Taken together the RPM 14 and body computer 12 will be referred to as a supervisory sub-system for controlling energization of the low and high voltage distribution systems. Body computer 12 and RPM 14 are connected to low voltage chassis battery 40 through battery bus 39 so that both modules are powered as long as the chassis battery is present and has a charge. Those skilled in the art will realize that such a supervisory sub-system could be built as a single intelligent module or CAN node.

In response to movement of ignition switch 16 from an off (2) state to a position requesting an accessory state (1), an on state (3), or a start state (4), the low voltage bus 36 is energized so that a plurality of controllers relating to a number of components including high voltage components and accessories are available before a pre-charge sequence is initiated with respect to the high voltage distribution sub-system. Under the direction of body computer 12, RPM 14 generates a control signal applied to an electro-mechanical relay in the low voltage distribution box 42 which in turn connects low voltage bus 36 to the battery bus 39 for the chassis battery 40. The low voltage bus 36 is in turn connected to supply direct current power to a plurality of CAN nodes including a hybrid control module 20, an engine controller 22 (for hybrid vehicles), a high voltage inverter controller 24, electrified accessories controllers 26, DC to DC converter controllers 28 and a battery management system controller 30 for a high voltage battery 34. The battery management system controller 30 and high voltage battery 34 are located in a high voltage battery enclosure 32. The controllers report energization over serial datalink 18 which is monitored by the body computer 12.

A sequence of steps is taken in conjunction with non-emergency energization and de-energization of the high voltage bus 37. These steps can occur once communication is established between these controllers and the body computer 12 over serial datalink 18. A normal energization process for high voltage bus 37 includes a pre-charge sequence which produces a relatively slow, controlled migration of high voltage electrical potential to the high voltage loads 46. The pre-charge sequence begins with control signals sourced by the RPM 14 to isolation contactors located in the high voltage enclosure 44 related controls signal sourced by RPM 14 to the low voltage distribution box 12 as isolation contactors are connected to chassis ground through the low voltage distribution box 42.

Normal de-energization processes of the power distribution buses occur by movement of the ignition switch 16 to the off (2) position. Mechanically forced de-energization of the high voltage bus 37 can occur as a result of opening of one or more of a series of switches shown connected in series between the body computer 12 and the low voltage distribution box 42. These switches include a manual remote shutdown switch 52, an inertia detection switch 50 and a roll over detection switch 48.

Figure 2:
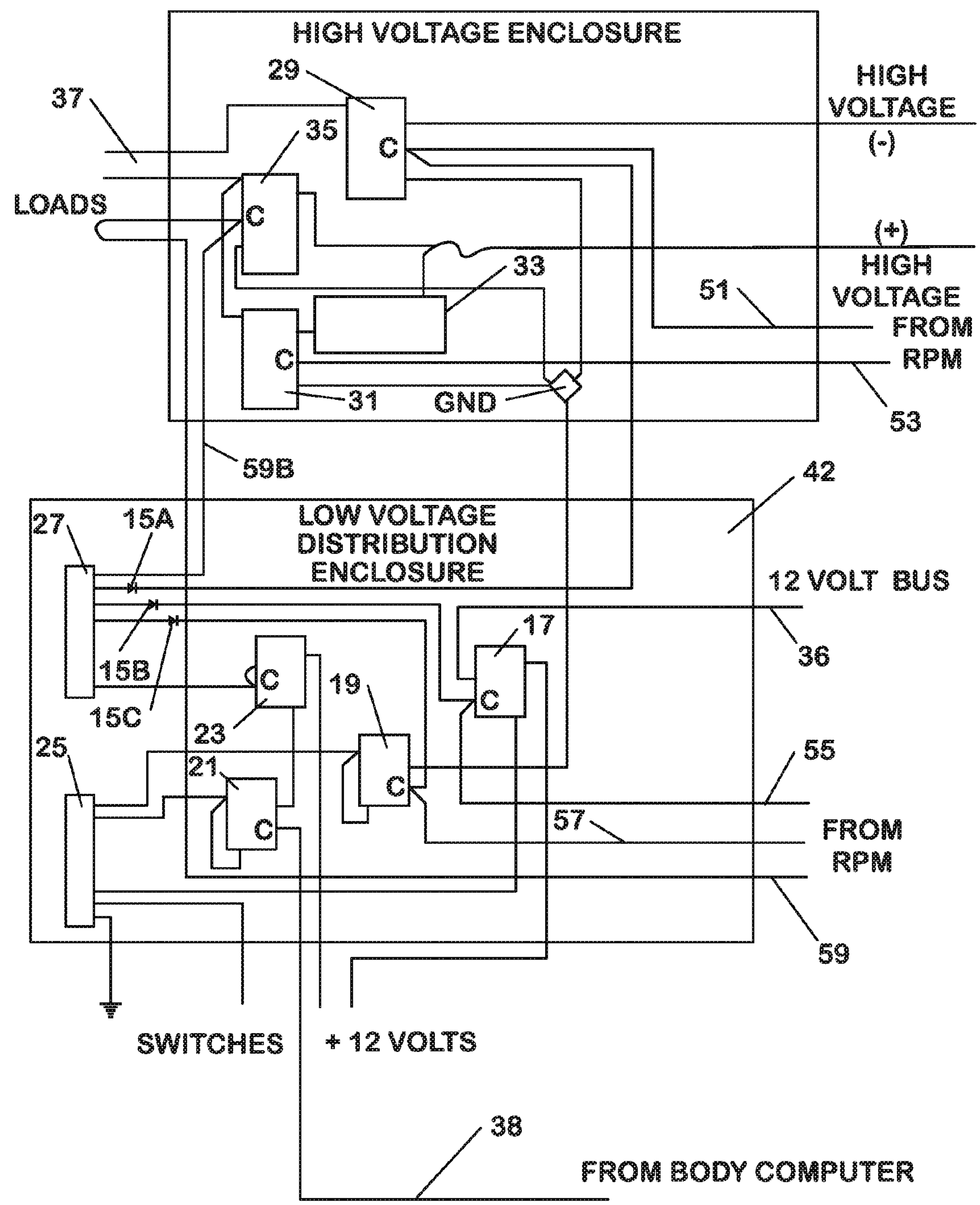
FIG. 2 is a more detailed schematic of low and high voltage power distribution relay systems from the control system of FIG. 1.

Referring to FIG. 2 the particulars of inter-operation of the low voltage distribution box 42 and the high voltage enclosure 44 are elaborated on, including use of power signals from the low voltage distribution box to maintain high voltage isolation contactor states.

Low voltage bus 36 energizes in response to a control signal applied to the control input of accessory power relay 17 from RPM 14 along control line 55. Closure of accessory power relay 17 results in +12 volt power being connected through the accessory relay to the low voltage bus 36. The control input of accessory power relay 17 and control line 55 are tied to a second potential signal source from a low voltage or latch bus bar 27 through a block diode 15B which is connected by its anode to the low voltage bus 36 and by its cathode to the accessory relay to forward conduct from the bus bar to the accessory relay. As long as the latch bus bar 27 is energized the accessory power relay 17 is held closed notwithstanding potential interruptions in the control signal from RPM 14. However, latch bus bar 27 is not energized from RPM 14 by signals on control line 55.

Concurrently with closure of the accessory power relay 17 the body computer 12 generates a control signal which is applied via a break latch control line 38 to a break latch relay 21 which closes to connect the low side of the control coil for latch relay 23 to ground through a chassis ground bus bar 25. This step allows latch relay 23 to be closed later in response to a control input.

Following energization of the low voltage bus 36 the steps directed toward energization of the high voltage loads 46 begin. The high voltage loads 46 energization cycle begins with the application of signals sourced from RPM 14 to control inputs of a low side high voltage isolation contactor 29 and pre-charge isolation contactor 31 in the high voltage enclosure 44 on control lines 51 and 53, respectively. The transition of low side isolation contactor 29 from open to closed connects high voltage loads 46 to the negative terminal of the high voltage source. The negative terminal of the high voltage source is usually tied to chassis ground, but the positive and negative terminals may still be considered to be of opposite polarity. The transition of pre-charge isolation contactor 31 from open to closed connects high voltage loads 46 to the positive terminal of the high voltage source through a pre-charge planar resistor 33 which allows voltage to begin rising on high voltage bus 37. The latch bus bar 27 is connected by a diode 15A to the control input of low side isolation contactor 29 and any electrical potential applied to latch bus bar 27 is superimposed on the control input while signals applied to the input by the RPM 14 are stopped by the diode. When energized the potential level on the latch bus bar 27 corresponds approximately to the potential level of control signals for application to the control inputs of the high voltage isolation contactors 29, 31.

Concurrently with generation of control signals for closing the low side isolation contactor 29 and pre-charge isolation contactor 31 the RPM 14 applies a control signal to control input of a service stop relay 19 along control line 57 causing it to close and thereby provide a near zero volt ground path to each high voltage isolation contactor 29, 31, 35 control coil ground.

During the initial stages of energization the high side isolation contactor 35 remains open. At the completion of the pre-charge cycle the RPM 14 sources a control signal on control line 59 for application to the high control side of a high side isolation contactor 35. After a brief closed state overlap between the pre-charge isolation contactor 31 and the high side isolation contactor 35, the pre-charge isolation contactor 31 opens upon cancellation of the control signal on its control input by RPM 14. Simultaneously with the energizing of the control coil of the high side isolation contactor 35 electrical potential is sourced to the latch bus bar 27 along control line 59 segment 59B. As the latch bus bar 27 is tied to the control input of latch relay 23 this results in latch relay 23 closing. The output from the latch relay 23 is further connected to its own output port so that once closed it is held closed by having its control input now directly almost directly connected to the chassis battery 40. The latch relay 23 is now kept closed until the break latch relay 21 is opened to deprive the control coil of the latch relay of a connection to ground (GND).

Operationally the following results occur. Were, during the pre-charge cycle one of the high voltage isolation contactors, that is low side isolation contactor 29 or pre-charge isolation contactor 31, to transition between states current through the system is limited by the pre-charge planar resistor 33. Once latch bus bar 27 is energized control signals from the RPM 14 have a backup. Any positive electrical potential on latch bus bar 27 is applied by forward biasing block diodes 15A, 15B and 15C to apply signals to the control inputs of low side isolation contactor 29, accessory power relay 17 and service stop relay 19. Latch bus bar 27 is though energized from chassis battery 40 via two routes, one running from the RPM 14 through the high voltage enclosure 44 and a second through latch relay 23. Put another way, latch relay 23 is held in a closed/latched condition by two distinct circuits. The first circuit includes RPM 14 and the second is a nearly direct connection from the low voltage chassis battery 40.

Forward biasing diode 15A provides chassis battery power to the high side of the control coil on the low side isolation contactor 29 insuring that the contactor remains energized during vehicle operation even if the RPM 14 fails to provide adequate electrical potential on control coil of the contactor. Likewise, forward biasing diode 15B supplies chassis battery 40 power to the high or control side of the control coil of accessory power relay 17 insuring that the relay remains energized during vehicle operations even if the RPM 14 fails to provide adequate electrical potential to maintain latching. Additionally, forward biased diode 15C provides chassis battery 40 to service stop relay 19 insuring that the relay remains energized should the RPM 14 fail to provide adequate electrical potential.

The latching of latch relay 23 with its attendant redundant power routing including nearly direct connection to a chassis battery 40, the low side and high side isolation contactors 29, 35 and the low voltage distribution box 42 relays 17, 19 and 23 remain in a steady energized state regardless of possible interruptions in datalink 18 operation, the occurrence of isolated ground shifts and the like which could disturb CAN modules like the RPM 14 related to power distribution control.

Shut down/de-energization of the high voltage power distribution is substantially unchanged. A non-emergency shutdown sequence begins with at least one CAN request or energy input request for de-energization being received by the body computer 12. The body computer 12 evaluates the various states and statuses of all effected CAN nodes 14, 20, 22, 24, 26, 28 and 30 involved in the transitioning of the high voltage isolation contactors 29, 35 to an open state. If the body computer 12 determines that all the necessary message states and statuses are good, the body computer 12 stops sourcing electrical potential to the control coil of the break latch relay 21 opening the ground circuit to the low side of the latch relay 23. Once the latch relay 23 releases and assumes its normally open state, RPM 14 assumes sole control of the high voltage isolation contactors 29, 35 and of the accessory and service stop power relays 17 and 19. If however, if the body computer 12 determines that not all necessary message states and status reports are good, it does not stop sourcing electrical potential to the break latch relay 21. However, where the request for de-energization comes from a non-datalink driven input device, such as ignition switch 16, remote shutdown switch 52, the roll over detection switch 48 or the inertia detection switch 50 body computer 12 may be programmed to force de-energization notwithstanding CAN nodes' states.

An existing vehicle datalink environment is combined with a hardwired electrical architecture to provide redundant energy paths supporting closed states of at least one high voltage isolation contactor. Multiple high voltage isolation contactors within the same vehicle architecture can be supported by creating parallel circuits between the preexisting low side and high side isolation contactors. The system is expandable to include an additional backup energy path to more than one low voltage, high current relay by integrating the relay's control coil with a diode to a latch power splice pack/low voltage power bus. Conditions for enabling or disabling the system are readily programmed into a vehicle body computer. Additionally, an in-cab graphics display the state and status of the mode of operation (e.g., enabled, disabled, enabled active and enabled inactive) may be provided.

The system also possesses the capability to maintain the redundant control power to isolation contactors and relays during times when electrical system experiences inrushes and low voltage conditions which impact the low voltage architecture reducing the voltage level needed for proper operation of the intelligent CAN controllers/nodes and their electrical subsequent outputs needed for closing and maintaining the control side of the high voltage isolation contactors and, or low voltage relays. This is all provided without loss of the ability to support an independent precharge circuit. This allows for unique pre-charge characterizations for each load associated with each set of high voltage isolation contactors. The system is applicable for use within a vehicle architecture which possesses more than one high voltage bus (example: 350 VDC and 700 VDC) as well as high voltage busses of differing potentials (example: one bus with the potential ranging from 0 VDC-350 VDC with a second bus or 350 VDC-700 VDC).

What is claimed is:

1. A direct current power distribution system comprising:

a low voltage direct current power source and an associated first low voltage bus for energization from the low voltage direct current power source;

a high voltage direct current power source and an associated high voltage bus for energization from the high voltage direct current power source;

a controller area network datalink;

a plurality of nodes connected to the controller area network datalink for exchanging data and further connected to the low voltage bus for energization;

an accessory relay responsive to a control input for connecting the first low voltage bus to the low voltage direct current power source;

a high side isolation contactor and a low side isolation contactor, the high and low side isolation contactors being responsive to control signals applied to control inputs for connecting the high voltage bus to the high voltage direct current power source and the low side isolation contactor to opposite polarity terminals of the high voltage direct current power source;

a supervisory sub-system for controlling energization of the low voltage bus and the high voltage bus by application of control signals to the control inputs of the accessory relay and to the low side and high side isolation contactors and further connected to the controller area network datalink for exchanging data with the plurality of nodes; and an external state select switch connected to the supervisory sub-system for requesting changes in state of the low voltage bus and the high voltage bus;

a second low voltage bus for energization to at least the control signal level for the high and low side isolation contactors, the second low voltage bus being connected to the control input of the high side isolation contactor and energized from the low voltage direct current power source in response to closure of the high side isolation contactor.

2. The direct current power distribution system of claim 1, further comprising:

a latch relay for connecting the second low voltage bus to the low voltage direct current power supply.

3. The direct current power distribution system of claim 2, further comprising:

the latch relay having a control input connected to the second low voltage bus and to its own power output terminal; and a break latch relay for providing a connection between the control coil of the latch relay and ground.

4. The direct current power distribution system of claim 3, further comprising:

a pre-charge isolation contactor connected in parallel with the high side isolation contactor, the pre-charge isolation contactor being controlled by control signals generated by the supervisory sub-system.

5. The direct current power distribution system of claim 3, further comprising:

the control input to the accessory relay being connected to the second low voltage bus.

6. The direct current power distribution system of claim 5, further comprising:

the connections from the second low power bus to the control inputs for the low side isolation contactor and the accessory relay including diodes oriented to forward conduct in the direction of the control inputs.

7. The direct current power distribution system of claim 5, further comprising:

a service stop relay for connecting the control coils of the low side isolation contactor, the high side isolation contactor and the pre-charge isolation contactor to ground.

8. A control system for an electric or hybrid-electric vehicle electrical power distribution system comprises:

at least first and second power distribution buses;

first and second power connection elements for connecting the first and second power distribution buses to sources of direct current power, the first and second power connection elements including control input terminals;

a supervisory sub-system responsive to exogenous inputs for generating first and second control signals for application to the control input terminals;

a latch relay having a control input tied to receive the second control signal and responsive to its presence for connecting its control input substantially directly to a power source; and the latch relay being connected by a forward conducting diode to the control input terminal for the first power connection element.

9. The control system of claim 8, further comprising:

a break latch relay connected between the latch relay and ground to allow release of the latch relay from of self locked condition.

10. The control system of claim 9, further comprising:

the second power connection element including a high side isolation contactor and a low side isolation contactor with the high side isolation contactor having a control input directly tied to the control input for the latch relay and the control input for the latch relay being connected by uni-directional current element to a control input for the low side isolation contactor.

11. The control system of claim 9, further comprising:

the first power connection including an accessory relay and a service stop relay, both relays having control inputs connected to the control input terminal for the latch relay by unidirectional current elements.

* * * * *